United States Patent

Hara

[11] Patent Number: 5,992,944
[45] Date of Patent: Nov. 30, 1999

[54] PUMP DEVICES

[75] Inventor: Masahiko Hara, Kanagawa, Japan

[73] Assignee: Unisia Jecs Corporation, Atsugi, Japan

[21] Appl. No.: 08/990,836

[22] Filed: Dec. 15, 1997

[30] Foreign Application Priority Data

Dec. 16, 1996 [JP] Japan .................................. 8-335390

[51] Int. Cl.⁶ .............................. B60T 13/16; B60T 8/40
[52] U.S. Cl. ...................... 303/10; 303/116.1; 303/116.2
[58] Field of Search ....................... 303/10, 116.1–116.4; 417/288, 383, 385, 388, 426–428

[56] References Cited

U.S. PATENT DOCUMENTS

| | | | |
|---|---|---|---|
| 4,681,513 | 7/1987 | Saito et al. | 417/2 |
| 4,808,077 | 2/1989 | Kan et al. | 417/2 |
| 4,810,168 | 3/1989 | Nogamie et al. | 417/2 |
| 4,887,870 | 12/1989 | Siegel | 303/116.1 |
| 4,898,129 | 2/1990 | Junghans et al. | 123/90.13 |
| 5,032,065 | 7/1991 | Yamamuro et al. | 417/428 |
| 5,067,881 | 11/1991 | Maehara | 417/498 |
| 5,094,597 | 3/1992 | Takai et al. | 417/428 |
| 5,114,314 | 5/1992 | Fujimoto | 417/3 |
| 5,167,493 | 12/1992 | Kobari | 417/273 |
| 5,529,466 | 6/1996 | Tackett | 417/529 |

FOREIGN PATENT DOCUMENTS

| | | |
|---|---|---|
| 26 46 583 | 4/1978 | Germany . |
| 37 27 174 | 2/1989 | Germany . |
| 64-77767 | 3/1989 | Japan . |
| 6-255474 | 9/1994 | Japan . |
| WO 96/18035 | 6/1996 | WIPO . |

*Primary Examiner*—Chris Schwartz
*Attorney, Agent, or Firm*—Foley & Lardner

[57] ABSTRACT

A pump device includes main and auxiliary eccentric portions integrated with a motor output shaft on the side of its base end and on the side of its pointed end. The main eccentric portion is larger in diameter than the auxiliary eccentric portion. A needle roller bearing and a ball bearing are fitted to the outer peripheries of the eccentric portions. Main and auxiliary pumps include a pair of plungers which abut on the outer peripheries of the bearings, respectively, and are driven by the main and auxiliary eccentric portions.

7 Claims, 2 Drawing Sheets

PUMP DEVICES

BACKGROUND OF THE INVENTION

The present invention relates generally to pump devices having two pumps arranged in parallel in the direction of a motor output shaft, and more particularly, to the pump devices applied to brake systems for motor vehicles with anti-lock brake control and cruising stabilizing control such as traction control or yaw-rate feedback control.

Conventionally, pump devices having two pumps arranged in parallel in the direction of a motor output shaft have been proposed to carry out anti-lock brake control, etc. One of the pump devices is known, for example, in JP-A 64-77767. This pump device includes eccentric parts arranged along a motor output shaft on the pointed-end side and on the base-end side, needle roller bearings arranged on the outer peripheries of the eccentric parts, and pairs of plungers arranged to abut on the outer peripheries of the bearings. Note that anti-lock brake control is effective when a master-cylinder pressure is produced by brake operation carried out by a driver.

Recently proposed are brake systems in which when a driver does not depress a brake, i.e., no master-cylinder pressure is produced, a wheel-cylinder pressure is produced to obtain a braking force by which cruising stabilizing control such as traction control or yaw-rate control is carried out. Production of the wheel-cylinder pressure when no master-cylinder pressure is produced needs immediate production or rise of a brake-fluid pressure. The use of a pump with a capacity enough for immediate production of the brake-fluid pressure results in wasteful energy consumption since the capacity is too large for anti-lock brake control, and in an increase in weight, installation space, and manufacturing cost.

For solving such problems, a brake system is proposed including main and auxiliary pumps arranged in parallel, wherein the main pump has a capacity necessary for anti-lock brake control, and the auxiliary pump serves to supply brake fluid to the inlet of the main pump upon cruising stabilizing control to ensure a pump capacity enough for cruising stabilizing control. The use of the pump device disclosed in JP-A 64-77767 for that purpose is advantageous in view of installation space, weight, and manufacturing cost.

However, the pump device disclosed in JP-A 64-77767 has the following inconveniences since the eccentric parts have substantially the same outer diameter:

The bearing is press fitted to the outer periphery of each eccentric part. When press fitted to the base-end side or second eccentric part, the bearing should pass over the pointed-end side or first eccentric part, which is impossible, however, when the motor output shaft is integrated with the eccentric parts since the eccentric parts have substantially the same outer diameter. Therefore, a shank or eccentric member having each eccentric portion arranged is formed separately from the motor output shaft, and the bearings are press fitted to the eccentric member from both ends. Moreover, connecting members are needed to connect the eccentric parts and the motor output shaft. Those result in complicated structure due to increase in the number of component parts, and increased manufacturing cost.

On the other hand, in case of applying the pump device to the brake system with anti-lock brake control and cruising stabilizing control, smooth supply of brake fluid to the main pump is obtained only if the auxiliary pump is in the discharge stroke when the main pump in the suction stroke, which requires driving of the plungers of the main and auxiliary pumps with phase shifted. With the pump device including the first and second eccentric parts having substantially the same outer diameter as disclosed in JP-A 64-77767, formation of the shapes of the first and second eccentric parts with different phases consumes time, and integration of the first and second eccentric parts with the motor output shaft is difficult to be done. Moreover, amounting of two bearings to the motor output shaft from one direction becomes more difficult.

It is, therefore, an object of the present invention to provide pump devices which contribute to a reduction in component parts and manufacturing cost with excellent work efficiency, and enable easy formation of first and second eccentric parts with different phases.

SUMMARY OF THE INVENTION

One aspect of the present invention lies in providing a pump device driven by a motor with an output shaft, comprising:

first and second eccentric portions integrated with the output shaft on the side adjacent to the motor and on the side distant therefrom, said first eccentric portion being larger in diameter than said second eccentric portion;

first and second bearings fitted to outer peripheries of said first and second eccentric portions; and first and second pumps including first and second plungers, said first and second plungers abutting on said outer peripheries of said first and second bearings, said first and second pumps being driven by said first and second eccentric portions.

DETAILED DESCRIPTION OF THE INVENTION

Figure 1:
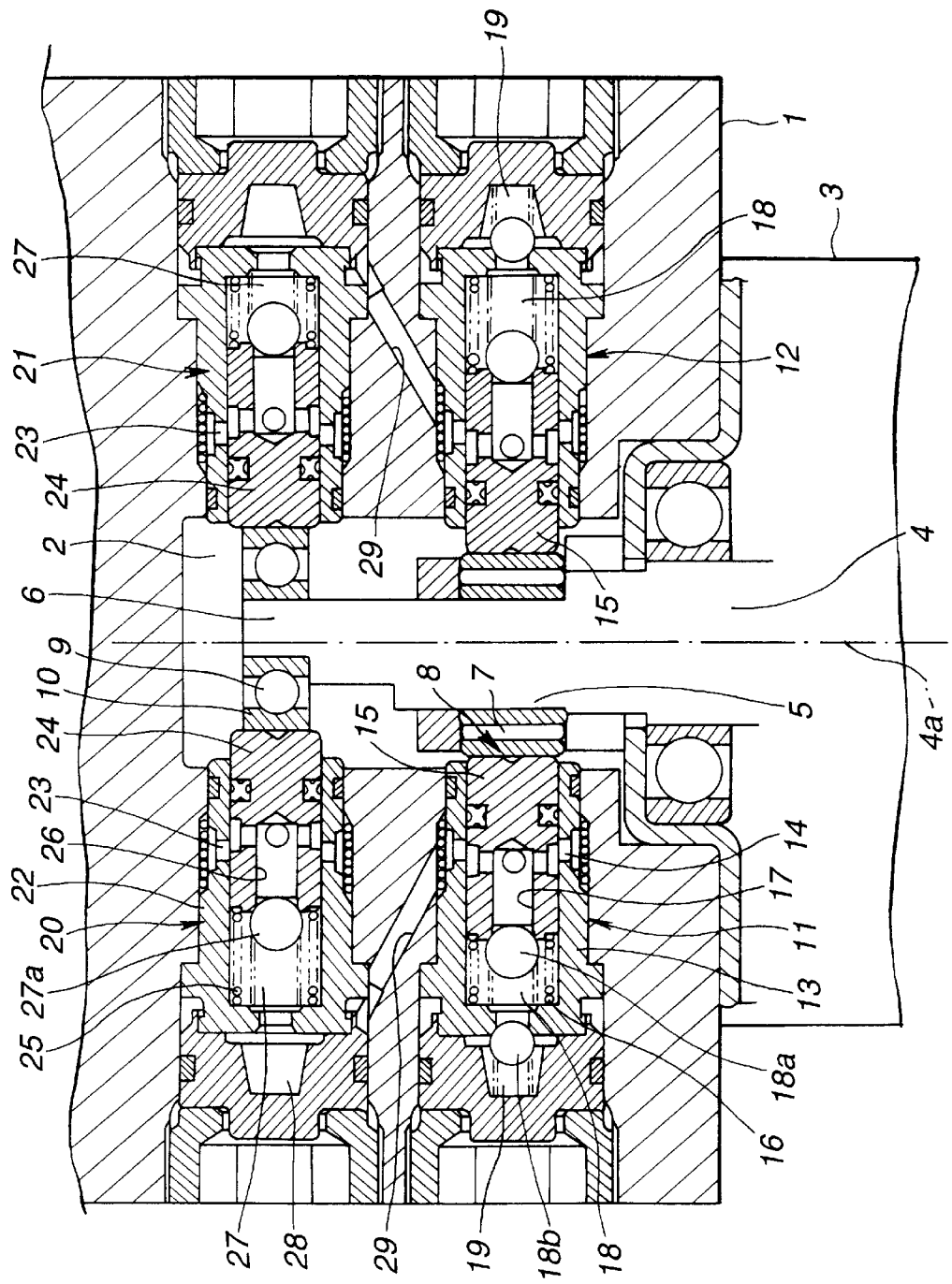
FIG. 1 is a longitudinal section showing an embodiment of a pump device according to the present invention.

Referring to FIG. 1, a pump device embodying the present invention includes a housing 1 with a cam-shaft hole 2 formed through a side thereof, and a motor 3 mounted to the side of the housing 1 with an output shaft 4 arranged through the cam-shaft hole 2.

The output shaft 4 is integrated with a main or first eccentric portion 5 on the side of its base end, i.e., on the side adjacent to the motor 3, and an auxiliary or second eccentric portion 6 on the side of its pointed end, i.e., on the side distant from the motor 3. The auxiliary eccentric portion 6 is smaller in diameter than the main eccentric portion 5, and has an eccentric phase shifted 180° with respect to the main eccentric portion 5. As shown in FIG. 1, the auxiliary eccentric portion 6 partly corresponds to an axial extension line of the outer periphery of the main eccentric portion 5.

A needle roller bearing or first bearing 7 is press fitted to the output shaft 4 in the main eccentric portion 5, having an outer peripheral surface which forms a main cam 8. A ball bearing or second bearing 9 is press fitted to the auxiliary eccentric portion 6, having an outer peripheral surface which forms an auxiliary cam 10. In view of the fact that the difference between the outer diameter of an inner ring and the inner diameter of an outer ring is small for the needle roller bearing 7, and great for the ball bearing 9, the bearings 7, 9 are selected having substantially the same outer diameter of the outer ring.

A pair of main or first pumps 11, 12 having the same structure is arranged to face each other across the main cam 8. Each main pump 11, 12 comprises a cylinder 13 press fitted in a hole of the housing 1, a suction passage 14 formed through the cylinder 13, a plunger 15 slidably arranged in the cylinder 13, a spring 16 for always biasing the plunger 15 to the main cam 8, a fluid passage 17 formed through the plunger 15 to ensure communication between the suction passage 14 and a pump chamber 18 as will be described later, the pump chamber 18 arranged in the bottom of the cylinder 13, suction and discharge valves 18a, 18b for controlling suction/discharge of brake fluid to/from the pump chamber 18, and a discharge chamber 19 for receiving brake fluid discharged from the pump chamber 18.

A pair of auxiliary or second pumps 20, 21 having the same structure is arranged to face each other across the auxiliary cam 10. The auxiliary pumps 20, 21 are disposed adjacent to the main pumps 11, 12 in the axial direction of the output shaft 4 of the motor 3. Each auxiliary pump 20, 21 comprises a cylinder 22 press fitted in a hole of the housing 1, a suction passage 23 formed through the cylinder 22, a plunger 24 slidably arranged in the cylinder 22, a spring 25 for always biasing the plunger 24 to the auxiliary cam 10, a fluid passage 26 formed through the plunger 24 to ensure communication between the suction passage 23 and a pump chamber 27 as will be described later, the pump chamber 27 arranged in the bottom of the cylinder 22, a suction valve 27a for allowing only suction of brake fluid to the pump chamber 27, and a discharge chamber 28 for receiving brake fluid discharged from the pump chamber 27. The discharge chamber 28 communicates with the suction passage 14 of each main pump 11, 12 though a fluid passage 29.

Next, the operation of the pump device will be described.

The main pumps 11, 12 and the auxiliary pumps 20, 21 are disposed to face each other, respectively, so that upon rotation of the output shaft 4 of the motor 3, one pump is in the suction stroke, whereas the other pump is in the discharge stroke. Specifically, in the state as shown in FIG. 1, the main pump 11 is in the discharge stroke, whereas the other main pump 12 is in the suction stroke; and the auxiliary pump 20 is in the suction stroke, whereas the other auxiliary pump 21 is in the discharge stroke. Since the phases of the main and auxiliary cams 8, 10 are shifted 180° with each other, the auxiliary pump 20 disposed adjacent to the main pump 11 and communicating therewith is in the opposite stroke to that of the main pump 11. Likewise, the auxiliary pump 21 is in the opposite stroke to that of the main pump 12. Therefore, the main pumps 11, 12 suck brake fluid discharged from the auxiliary pumps 20 21 through the fluid passage 29.

Figure 2:
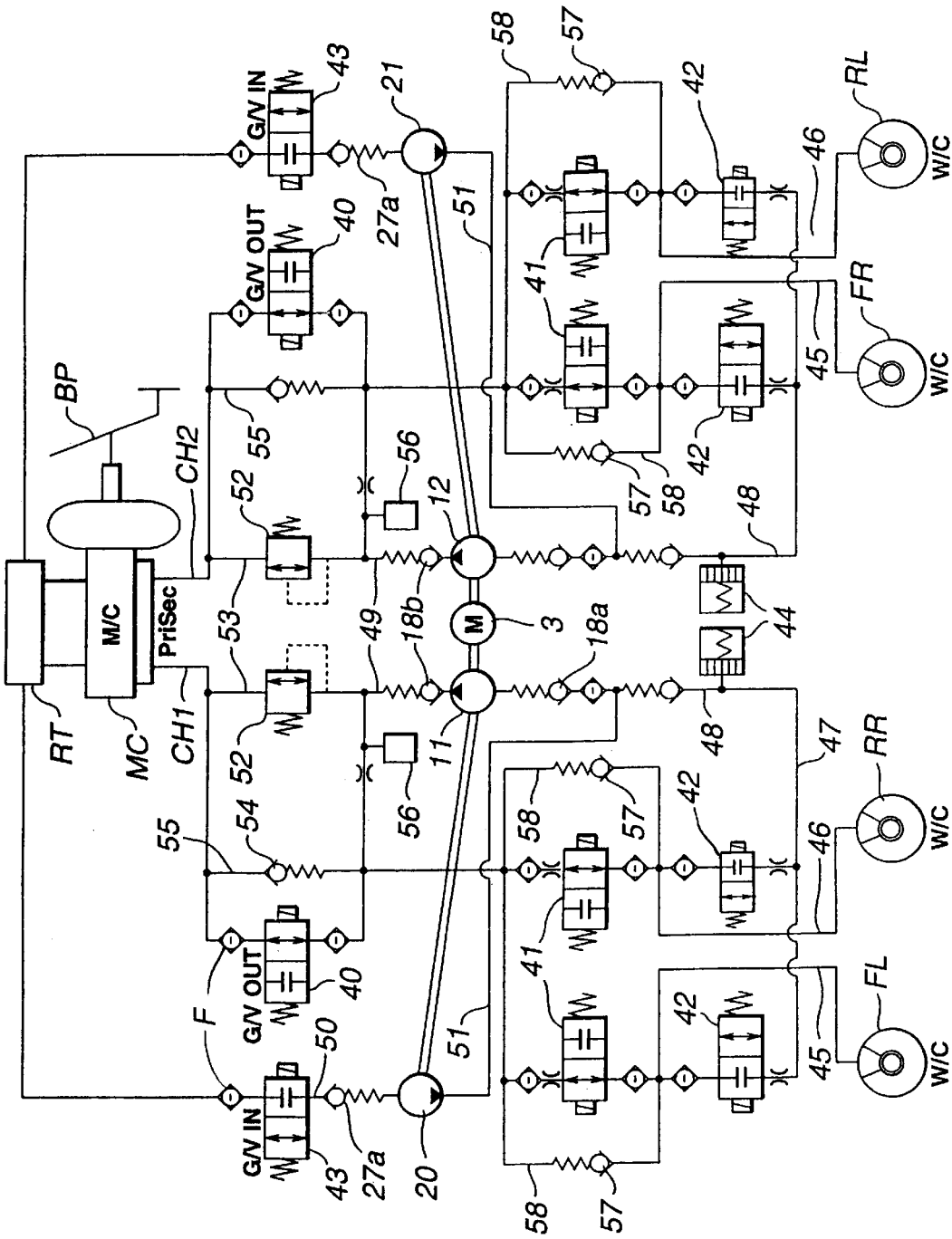
FIG. 2 is a block diagram showing a brake system using the pump device.

Referring to FIG. 2, a brake system for a motor vehicle using the above pump device includes a brake pedal BP. When depressing the brake pedal BP, a brake-fluid pressure is produced in a master cylinder MC, which is transmitted to wheel cylinders FL, RR of front-left and rear-right wheels through a first channel circuit CH1, and to wheel cylinders FR, RL of front-right and rear-left wheels through a second channel circuit CH2. The brake system is constructed to produce two brake-fluid pressures by the channel circuits CH1, CH2 connected in the X-shaped way. In view of the channel circuits CH1, CH2 having the same structure, a description will be made with regard to the first channel circuit CH1 only.

Note that in FIG. 2, a reference numeral 40 designates a normally-open OUT-side gate valve, 41 designates a normally-open inlet valve, 42 designates a normally-closed outlet valve, 43 designates a normally-closed IN-side gate valve, 52 designates a relief valve, 54, 57, 59 designate one-way valves, 56 designates a damper RT designates a reservoir tank, and F designates a filter.

Next, the operation of the brake system as well as the detailed structure thereof will be described.

a) Upon Ordinary Brake Operation

Ordinarily, the OUT-side gate valves 40, the inlet valves 41, the outlet valves 42, and the IN-side gate valves 43 are in their normal position as shown in FIG. 2. Specifically, in the normal operating position, all of the OUT-side gate valves 40 are in the closed position, all of the inlet valves 41 are in the open position, all of the outlet valves 42 are in the closed position, and all of the IN-side valves 43 are in the closed position, as shown in FIG. 2. In this state, when depressing the brake pedal BP, the brake-fluid pressure produced in the master cylinder MC is transmitted to the wheel cylinders FL, RR through the first channel circuit CH1 via the OUT-side gate valve 40, the inlet valve 41, branch circuits 45, 46, etc., carrying out braking of the wheels in accordance with depression of the brake pedal BP.

b) Upon Anti-lock Brake Control

When the wheels are locked or comes near to be locking during brake operation, a control unit, not shown, detects it in accordance with a wheel skid rate to carry out anti-lock brake control for preventing locking of the wheels by maintaining the skid rate within a predetermined range.

Anti-lock brake control is a control which ensures decreasing, maintaining, or increasing of the brake-fluid pressure to prevent locking of the wheels during brake operation. When the skid rate of one of the left-front and right-rear wheels or the skid rates of the two are greater than a first predetermined value, the control unit starts driving of the motor 3, and supplies power to the inlet and outlet valves 41, 42 of the branch circuits 45, 46 connected to the wheel cylinders FL, RR for braking the wheels which come near to be locked so as to close the inlet valve 41 and open the outlet valve 42.

Closing of the inlet valve 41 stops an increase in brake-fluid pressures within the wheel cylinders FL, RR from the master cylinder MC. On the other hand, opening of the outlet valve 42 allows a decrease in brake-fluid pressures within the wheel cylinders FL, RR by discharge of brake fluid therefrom to a reservoir 44 through a discharge circuit 47, relieving a braking force. Brake fluid accumulated in the reservoir 44 is sucked in a main suction circuit 48 by driving of the main pump 11, which is then recirculated to the first channel circuit CH1 through a main discharge circuit 49.

When this reduction in braking force makes the skid rate smaller than the first predetermined value, the control unit stops power supply to the outlet valve 42 to close it, maintaining the brake-fluid pressures within the wheel cylinders FL, RR.

When this maintaining of the brake-fluid pressures makes the skid rate smaller than a second predetermined value, the control unit cuts off power supply to the inlet valve 41. As a consequence, high-pressure brake fluid within the first channel circuit CH1 is supplied to wheel cylinders FL, RR through the inlet valve 41 which is open, increasing the braking force again.

Repetition of the above operation allows maintaining of the skid rate within the predetermined range during depression of the brake pedal BP, achieving anti-lock brake control wherein a maximum braking force is obtained with locking of the wheels prevented.

Upon anti-lock brake control, the IN-side gate valve 43 is supplied with no power and is kept closed, so that the auxiliary pump 20, though driven by the motor 3, cannot suck brake fluid, failing to fulfill a function of supplying brake fluid.

c) Upon Cruising Stabilizing Control

When carrying out cruising stabilizing control such as maintaining of increased skid rate of the driving wheels due to quick start and acceleration of the vehicle within a predetermined range, or stabilizing of a vehicular posture by the braking force, the control unit drives the motor 3, and supplies power to the gate valves 40, 43. By this, the OUT-side gate valve 40 is closed to shut off the first channel circuit CH1 at that position, and the IN-side gate valve 43 is open to put an auxiliary suction circuit 50 in communication.

Thus, the auxiliary pump 20 sucks brake fluid within a reservoir tank RT through the auxiliary suction circuit 50 to discharge it to an auxiliary discharge circuit 51, whereas the main pump 11 sucks brake fluid from the auxiliary discharge circuit 51 to discharge it to the main discharge circuit 49, obtaining increased brake-fluid pressures within the wheel cylinders FL, RR.

The operation of the inlet valve 41 and the outlet valve 42 increases, maintains, or decreases the brake-fluid pressure within the wheel cylinder FL or RR to produce a desired braking force, obtaining reduced skid rate or stabilized vehicular posture through a yaw moment produced in a vehicular body. One of the examples of this posture stabilizing control is such that upon oversteer a braking force is provided to a front wheel as a turning outer wheel to produce a yaw moment in the understeer direction, and upon understeer it is provided to a front wheel as a turning inner wheel to produce a yaw moment in the oversteer direction.

As described above, the pump device includes the auxiliary pumps 20, 21 arranged in series on the suction side of the main pumps 11, 12. When opening the IN-side gate valve 43, brake fluid discharged from the auxiliary pumps 20, 21 is immediately sucked by the main pumps 11, 12. Thus, with no brake fluid accumulated in the reservoir 44, brake-fluid pressure can immediately be supplied to the channel circuits CH1, CH2, enabling control of a braking force without production of a master-cylinder pressure.

The pump device produces the following effects:

Since the main and auxiliary eccentric portions 5, 6 are integrated with the output shaft 4 of the motor 3, eccentric-portion members separated from the output shaft 4 and a member for connecting the two are not needed, resulting in simplified structure of the device due to reduced number of component parts, and reduced manufacturing cost.

Further, though the eccentric portions 5, 6 are integrated with the output shaft 4, the bearings 7, 9 can be press fitted to the eccentric portions 5, 6 as follows. The main eccentric portion 5 disposed at the base end of the output shaft 4 is larger in diameter than the auxiliary eccentric portion 6 disposed at the pointed end of the output shaft 4, the auxiliary eccentric portion 6 being located inside the outer periphery of the main eccentric portion 5. Therefore, the needle roller bearing 7 can be fitted to the main eccentric portion 7 from the pointed end of the output shaft 4, passing over the auxiliary eccentric portion 6 without difficulty. The fact that both of the bearings 7, 9 can be fitted to the output shaft 4 from its pointed end allows integration of the eccentric portions 5, 6 with the output shaft 4.

Furthermore, the needle roller bearing 7 having smaller difference between the outer diameter of an inner ring and the inner diameter of an outer ring serves as a bearing fitted to the main eccentric portion 5 having larger diameter, and the ball bearing 9 having smaller difference between the outer diameter of an inner ring and the inner diameter of an outer ring serves as a bearing fitted to the auxiliary eccentric portion 6 having smaller diameter, easily obtaining substantially the same outer diameter of the bearings 7, 9. In that case, the plungers 15, 24 have substantially equal stroke amount even with the difference between the outer diameters of the eccentric portions 5, 6, increasing the degree of freedom with regard to determination of a required operation space of the plunger 15, 24 and a capacity of the pump 11, 12, 20, 21.

Having described the present invention in connection with the preferred embodiment, it is noted that the present invention is not limited thereto, and various changes and modifications can be made without departing from the scope of the present invention. By way of example, in the embodiment, the auxiliary discharge circuit 51 is connected downstream of the suction valve 18a of the main pump 11, alternately, it may be connected upstream thereof.

What is claimed is:

1. A pump device driven by a motor with an output shaft, comprising:

first and second eccentric portions integrated with the output shaft on the side adjacent to the motor and on the side distant therefrom, said first eccentric portion being larger in diameter than said second eccentric portion;

first and second bearings fitted to outer peripheries of said first and second eccentric portions; and first and second pumps including first and second plungers, said first and second plungers abutting on said outer peripheries of said first and second bearings, said first and second pumps being driven by said first and second eccentric portions.

2. A pump device as claimed in claim 1, wherein said first and second eccentric portions have phases shifted 180° with each other.

3. A pump device as claimed in claim 1, wherein said first bearing includes a needle roller bearing.

4. A pump device as claimed in claim 1, wherein said second bearing includes a ball bearing.

5. A pump device as claimed in claim 1, wherein said first and second bearings are of substantially the same outer diameter.

6. A pump device as claimed in claim 1, wherein said first and second plungers each include a pair of diametrically opposing plungers.

7. A pump device as claimed in claim 1, wherein said first and second pumps are adapted to a brake system for controlling a fluid pressure within a wheel cylinder of a motor vehicle, said first pump corresponding to a main pump for supplying a brake fluid to a circuit connecting a master cylinder of said brake system and said wheel cylinder, said second pump corresponding to an auxiliary pump for supplying said brake fluid of said master cylinder to a suction side of said main pump.

* * * * *